United States Patent
Hara

(10) Patent No.: US 10,183,739 B2
(45) Date of Patent: Jan. 22, 2019

(54) ACTUATOR DEVICE FOR AIRCRAFT, AND AIRCRAFT

(71) Applicant: MITSUBISHI AIRCRAFT CORPORATION, Aichi (JP)

(72) Inventor: Akihiro Hara, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 106 days.

(21) Appl. No.: 14/190,730

(22) Filed: Feb. 26, 2014

(65) Prior Publication Data

US 2014/0312170 A1  Oct. 23, 2014

(30) Foreign Application Priority Data

Feb. 28, 2013  (JP) .................................. 2013-39639

(51) Int. Cl.
*B64C 13/42* (2006.01)

(52) U.S. Cl.
CPC ....... *B64C 13/42* (2013.01); *F15B 2211/8752* (2013.01); *F15B 2211/8757* (2013.01)

(58) Field of Classification Search
CPC ....... B64C 9/02; B64C 2009/005; B64C 9/16; B64C 9/32; B64C 13/42;

(Continued)

(56) References Cited

U.S. PATENT DOCUMENTS 3,270,623 A * 9/1966 Garnjost ................. F15B 18/00
  137/625.62
3,314,334 A * 4/1967 Palmer .................... B64C 13/24
  91/1

(Continued)

FOREIGN PATENT DOCUMENTS

JP  2004-173224 A  6/2004
JP  2004-175224 A  6/2004

(Continued)

OTHER PUBLICATIONS

National Instruments , Redundant System Basics Concepts (NI-Tutorial-6874-en), Jan. 11, 2008; accessed from http://www.ni.com/white-paper/6874/en/ on May 4, 2016.*

(Continued)

*Primary Examiner* — Tien Q Dinh
*Assistant Examiner* — Alexander V. Giczy
(74) *Attorney, Agent, or Firm* — Pearne & Gordon LLP

(57) ABSTRACT

An actuator device includes a first and second actuators. The actuator device comprises a control system that is configured to switch the first actuator to a standby state and switch the second actuator to an active state in response to a first condition set wherein a hydraulic value in a first hydraulic system is equal to or less than a predetermined first threshold value and a second hydraulic value in a second hydraulic system is equal to or more than the predetermined second threshold value; and in response to a second condition set wherein the first hydraulic value is equal to or less than the predetermined first threshold value, the second hydraulic value is less than the predetermined second threshold value, and a difference between a current position and target position of a cylinder of the first actuator is equal to or more than a predetermined third threshold value.

17 Claims, 3 Drawing Sheets

(58) Field of Classification Search
CPC ..... F15B 2211/8757; F15B 2211/8752; G05D 16/10; F16K 11/044
See application file for complete search history.

(56) References Cited

U.S. PATENT DOCUMENTS

| | | | | |
|---|---|---|---|---|
| 3,426,650 A * | 2/1969 | Jenney | ............... | F15B 18/00 244/194 |
| 3,505,929 A * | 4/1970 | Coppola | ............... | F15B 18/00 244/195 |
| 3,587,393 A * | 6/1971 | Vick | ............... | F15B 20/005 137/102 |
| 3,724,330 A * | 4/1973 | Mason | ............... | G05D 1/0077 91/363 A |
| 4,120,469 A * | 10/1978 | Westermeier | ............... | G05B 9/03 244/194 |
| 4,159,444 A * | 6/1979 | Bartlett | ............... | G05B 9/03 244/194 |
| 4,257,311 A * | 3/1981 | Barnsley | ............... | G05D 1/0077 91/363 A |
| 4,355,358 A * | 10/1982 | Clelford | ............... | G05D 1/0077 244/17.13 |
| 4,472,780 A * | 9/1984 | Chenoweth | ............... | G05D 1/0077 244/194 |
| 4,594,714 A * | 6/1986 | Fischer | ............... | G05B 9/03 244/194 |
| 4,744,532 A * | 5/1988 | Ziegler | ............... | B64C 13/503 244/78.1 |
| 4,807,516 A * | 2/1989 | Takats | ............... | G05D 1/0077 244/194 |
| 4,905,933 A * | 3/1990 | Ako | ............... | B64C 13/42 244/99.4 |
| 5,422,808 A * | 6/1995 | Catanese, Jr. | ............... | G05B 19/4063 307/132 E |
| 5,806,805 A * | 9/1998 | Elbert | ............... | B64C 13/42 244/195 |
| 6,257,529 B1 * | 7/2001 | Kubo | ............... | B64C 13/42 244/194 |
| 7,567,862 B2 * | 7/2009 | Pelton | ............... | B64D 45/0005 701/33.8 |
| 7,970,583 B2 * | 6/2011 | Novis | ............... | F15B 15/2815 702/183 |
| 8,068,943 B2 * | 11/2011 | Manfred | ............... | G05D 1/0077 244/75.1 |
| 2003/0127569 A1 * | 7/2003 | Bacon | ............... | G05D 1/0077 244/195 |
| 2004/0095998 A1 | 5/2004 | Luo et al. | | |
| 2005/0001090 A1 | 1/2005 | Tanaka et al. | | |
| 2005/0116095 A1 * | 6/2005 | Cline | ............... | B64C 13/42 244/99.9 |
| 2007/0033435 A1 * | 2/2007 | Stange | ............... | G05B 9/03 714/15 |
| 2007/0164166 A1 * | 7/2007 | Hirvonen | ............... | B64C 13/42 244/175 |
| 2009/0048689 A1 | 2/2009 | Pelton | | |
| 2010/0185344 A1 * | 7/2010 | Roach | ............... | B64C 13/42 701/4 |
| 2010/0243084 A1 * | 9/2010 | Yoshioka | ............... | F16K 31/1221 137/529 |
| 2011/0208363 A1 * | 8/2011 | Vanderlaan | ............... | E02F 9/207 700/282 |
| 2011/0256000 A1 * | 10/2011 | Fukui | ............... | F04B 49/002 417/213 |
| 2011/0278392 A1 | 11/2011 | Fukui | | |
| 2012/0029859 A1 * | 2/2012 | Fukui | ............... | B64C 13/40 702/114 |
| 2013/0001357 A1 * | 1/2013 | Cyrot | ............... | B64C 13/28 244/99.4 |
| 2013/0026287 A1 * | 1/2013 | Goupil | ............... | B64D 45/0005 244/99.9 |

FOREIGN PATENT DOCUMENTS

| | | |
|---|---|---|
| JP | 2010230050 A | 10/2010 |
| JP | 2011-235844 A | 11/2011 |
| JP | 2012025329 A | 2/2012 |

OTHER PUBLICATIONS

ReliaSoft Corporation, Determining the Reliability of a System with Standby Redundancy, published in Reliability HotWire, Issue 21, Nov. 2002; accessed from http://www.weibull.com/hotwire/issue21/relbasics21.htm on May 4, 2016.*

Ryder, D. R. Redundant Actuator Development Study, NASA CR-114730. Dec. 1973. Accessible from https://ntrs.nasa.gov/archive/nasa/casi.ntrs.nasa.gov/19740013542.pdf, accessed May 23, 2017.*

Office Action dated Nov. 29, 2016 for JP 2013-039639.

\* cited by examiner

ACTUATOR DEVICE FOR AIRCRAFT, AND AIRCRAFT

BACKGROUND OF THE INVENTION

Field of the Invention

The present invention relates to an actuator device which drives a flight control surface of an aircraft.

Description of the Related Art

In aircrafts, a hydraulically-operated actuator is generally used for driving an aileron, an elevator, and a rudder that constitute a control surface. The hydraulic actuator drives the flight control surface such as the aileron upon supply of hydraulic oil from a hydraulic power source provided on an aircraft fuselage side. To ensure reliability for the aircrafts, a hydraulic system which uses a plurality of actuators, and supplies hydraulic oil thereto has been proposed (e.g., Japanese Patent Laid-Open No. 2011-235844).

The aircrafts are required to continuously drive the flight control surface by using the actuator device even when the function of the hydraulic power source on the fuselage side is lost or reduced. Thus, Japanese Patent Laid-Open No. 2011-235844 proposes the hydraulic system for an aircraft actuator including the plurality of actuators that drive one control surface, wherein a backup hydraulic pump capable of supplying pressure oil to the actuators when the function of a fuselage-side hydraulic power source is lost or reduced, and an electric motor that drives the pump are provided.

There is also known an actuator device which drives one flight control surface by using some of a plurality of actuators, and, when there is a failure in the actuators driving the flight control surface, continues to drive the flight control surface by using actuators that have not been used for driving the flight control surface (Japanese Patent Laid-Open No. 2004-175224). In the present specification, a state in which the actuator is driving the flight control surface is called "active", and a state in which the actuator is not driving the flight control surface is called "standby". An actuator device which puts at least one of a plurality of actuators into an active state and the other actuators into a standby state ensures redundancy required in the aircrafts. The actuator device in Japanese Patent Laid-Open No. 2004-175224 proposes to use a servo actuator so as to smoothly switch the actuators for driving the flight control surface.

In Japanese Patent Laid-Open No. 2004-175224, only a main control unit that controls the active actuator generates a follower signal to switch the actuators for driving the flight control surface, so that the active actuator and the standby actuator can be smoothly switched. However, Japanese Patent Laid-Open No. 2004-175224 does not disclose at which timing the actuators are switched in relation to a failure including the lost or reduction of the function of a hydraulic power source. If the actuators are switched at a wrong timing, the actuators may not be smoothly switched to generate a rapid change in deflection angle.

Thus, an object of the present invention is to provide an actuator device for a flight control surface which can prevent a rapid change in deflection angle when an active actuator and a standby actuator are switched.

SUMMARY OF THE INVENTION

To achieve the above object, an actuator device which drives a flight control surface of an aircraft includes: a first actuator that drives a flight control surface; and a second actuator that is switched from the first actuator to drive the flight control surface.

The first actuator drives the flight control surface upon supply of hydraulic oil through a first hydraulic system from a first hydraulic power source. The second actuator drives the flight control surface upon supply of hydraulic oil through a second hydraulic system from a second hydraulic power source.

In the actuator device according to the present disclosure, the first actuator functions in an active state and the second actuator functions in a standby state during normal cruising. At this point, the second actuator does not actively perform an operation of driving the flight control surface. Therefore, the actuator device according to the present disclosure ensures redundancy. More specifically, in a state in which the first actuator functions in an active state and the second actuator functions in a standby state, the actuator device is configured to perform a switching operation in response to a first condition set wherein a first hydraulic value of the hydraulic oil in the first hydraulic system is equal to or less than a predetermined first threshold value and a second hydraulic value in the second hydraulic system is equal to or more than a predetermined second threshold value. Under the switching operation, the first actuator is switched from the active state to a standby state, and the second actuator is switched from the standby state to an active state.

Since the second actuator is switched from the standby state to the active state after it is confirmed that a hydraulic pressure at which the second actuator can be normally driven is held, the reliability of movement of the control surface after switching the actuators can be ensured. Thus, a transient (a transient phenomenon), i.e., a rapid change in deflection angle can be prevented.

The first threshold value and the second threshold value may preferably have a relationship of the first threshold value<the second threshold value.

On the other hand, when the first hydraulic value of the hydraulic oil in the first hydraulic system is equal to or less than a predetermined first threshold value but the second hydraulic value of the hydraulic oil in the second system is less than the predetermined second threshold value, the first actuator is maintained in the active state, and the second actuator is maintained in the standby state. However, when the first hydraulic value of the hydraulic oil in the first hydraulic system is equal to or less than a predetermined first threshold value, the second hydraulic value in the second hydraulic system is equal to or more than a predetermined second threshold value, and a difference between a current position and a target position of the first actuator is equal to or more than a predetermined third threshold value, the first actuator may be switched from the active state to the standby state, and the second actuator may be switched from the standby state to the active state.

In the actuator device according to the present disclosure, the first actuator may be switched from the active state to the standby state and the second actuator may be switched from the standby state to the active state based on any of the following additional conditions:

a first condition that an operation mode for the first hydraulic system is changed from a normal mode to a direct mode, and a second condition that a failure of a device belonging to the first hydraulic system is detected.

In accordance with the actuator device for the flight control surface according to the present invention, the active actuator and the standby actuator can be switched while preventing the transient.

DETAILED DESCRIPTION OF THE PREFERRED EMBODIMENT

In the following, the present invention is described in detail based on an embodiment shown in the accompanying drawings.

Figure 1:
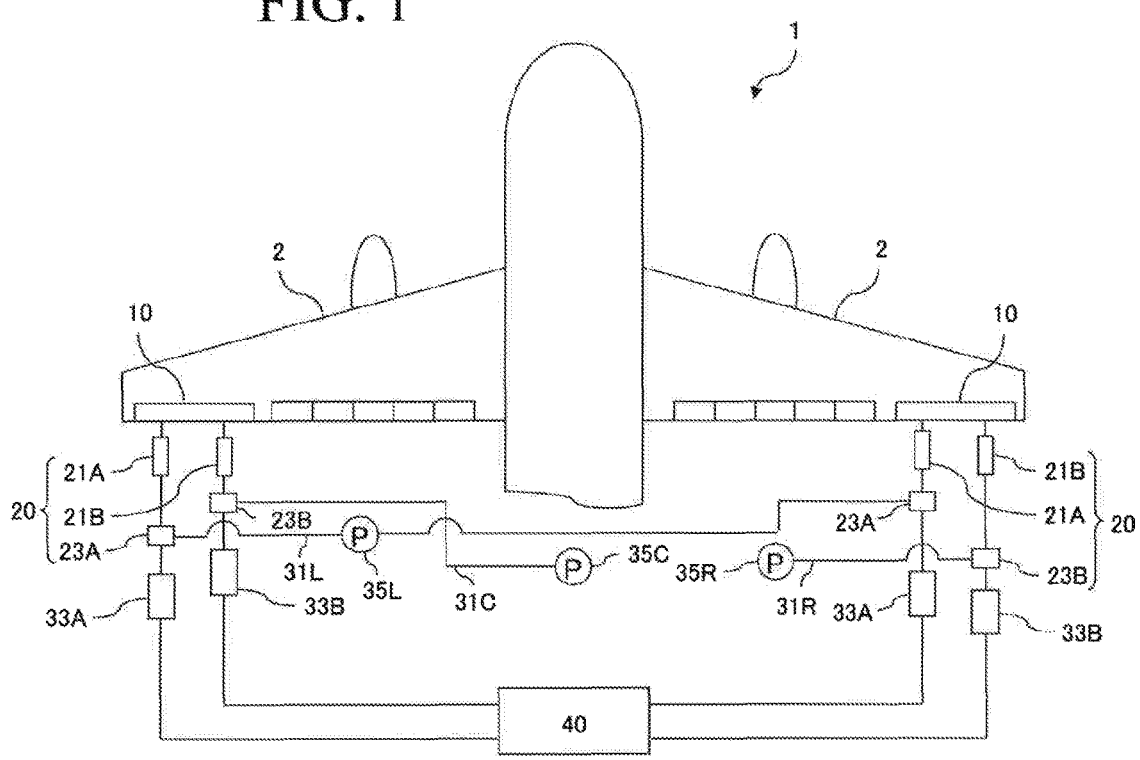
FIG. 1 is a view illustrating a schematic configuration of an actuator device for a flight control surface according to a present embodiment.
Figure 2:
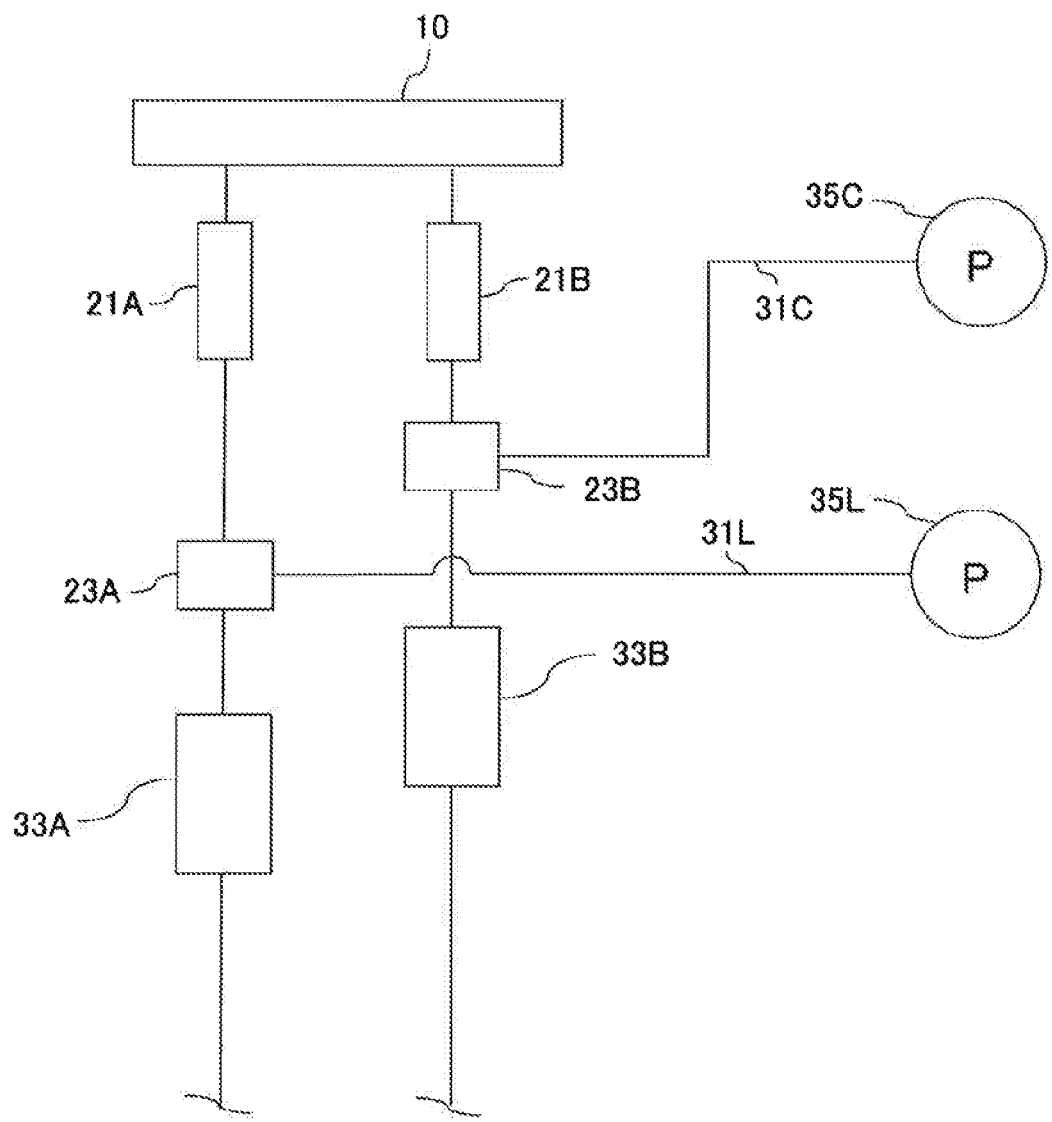
FIG. 2 is a view illustrating a main portion extracted from FIG. 1.

In the present embodiment, an example in which an actuator device according to the present invention is applied to an aileron 10 provided at a main wing 2 of an aircraft 1 as shown in FIGS. 1 and 2 is described.

The aileron 10 is provided at each of right and left main wings 2 and 2. For example, an outer skin of the aileron 10 is formed of CFRP (Carbon Fiber Reinforced Plastic). The aileron 10 is mounted to the main wing 2 via a hinge (not shown).

The aileron 10 at each of the main wings 2 includes an actuator device 20 as shown in FIG. 1. Each of the actuator devices 20 includes two drive sources of a first actuator 21A and a second actuator 21B. Hydraulic actuators (hydraulic cylinders) having the same specifications are employed as the first actuator 21A and the second actuator 21B. This is to drive the aileron 10 under the same conditions by using any of the actuators. Although the actuator device 20 is shown outside of the main wing 2 in FIG. 1, this is to facilitate understanding, and the actuator device 20 is actually accommodated within the main wing 2. The same applies to other elements described below.

As shown in FIGS. 1 and 2, the aircraft 1 includes three separate hydraulic supply systems of a left-side hydraulic system 31L, a center hydraulic system 31C, and a right-side hydraulic system 31R, which are independent of each other. Hydraulic oil is supplied to the first actuator 21A of the left-side main wing 2 from the left-side hydraulic system 31L, and to the second actuator 21B of the left-side main wing 2 from the center hydraulic system 31C. Hydraulic oil is supplied to the first actuator 21A of the right-side main wing 2 from the left-side hydraulic system 31L, and to the second actuator 21B of the right-side main wing 2 from the right-side hydraulic system 31R.

In the left-side hydraulic system 31L, a left-side hydraulic power source 35L and a control valve 23A are provided in a path for supplying the hydraulic oil to the left-side main wing 2. The left-side hydraulic power source 35L and a control valve 23A are also provided in a path for supplying the hydraulic oil to the right-side main wing 2. A center hydraulic power source 35C and a control valve 23B are provided in the center hydraulic system 31C. A right-side hydraulic power source 35R and a control valve 23B are provided in the right-side hydraulic system 31R.

[Controller 40, Actuator Controllers 33A and 33B]

A flight controller 40 is provided in the aircraft 1. The flight controller 40 is control means superordinate to a first actuator controller (referred to as first controller below) 33A and a second actuator controller (referred to as second controller below) 33B. The flight controller 40 is configured to command movement of the aileron 10 via the first controller 33A and the second controller 33B.

The flight controller 40 generates a command signal that commands the movement of the aileron 10 based on an operation and an instruction by a pilot, and transmits the command signal to the two controllers 33A and 33B. Accordingly, the first controller 33A and the second controller 33B respectively control operation of the first actuator 21A and the second actuator 21B by adjusting opening and closing of the first control valve 23A and the second control valve 23B or the like based on the command signal.

The configuration and the operation control described above are common to the right and left main wings 2.

The command signal includes an operation mode selected by a pilot. The operation mode includes two types of modes of a normal mode and a direct mode.

In the normal mode, an angle (a deflection angle) for deploying the aileron 10 is determined by applying a gain adjusted according to flight conditions (altitude, speed, or the like) of the aircraft 1 in response to the operation by a pilot. On the other hand, in the direct mode, the deflection angle of the aileron 10 is determined by applying a fixed gain in response to the operation by a pilot.

In normal cruising, it is instructed to drive the aileron 10 by using one of the actuators, i.e., the first actuator 21A. At this point, the other actuator, i.e., the second actuator 21B stands by so as to ensure redundancy, and does not actively perform an operation of driving the aileron 10. That is, in normal cruising, the first actuator 21A is in an active state, and the second actuator 21B is in a standby state. The second actuator 21B in the standby state follows the movement of the aileron 10 driven by the first actuator 21A, and thereby works as a damper for the operation of the first actuator 21A.

[Hydraulic Detection and Comparison by the Controllers 33A and 33B]

In the following, hydraulic detection and comparison are described by using the left-side main wing 2 as an example.

The first controller 33A acquires a pressure (a hydraulic pressure) of the hydraulic oil of the left-side hydraulic system 31L so as to monitor whether the left-side hydraulic system 31L operates normally. The second controller 33B acquires a pressure (a hydraulic pressure) of the hydraulic oil of the center hydraulic system 31C so as to monitor whether the center hydraulic system 31C operates normally. Here, the hydraulic pressure of the left-side hydraulic system 31L is represented as $P_A$ (a first hydraulic value), and the hydraulic pressure of the center hydraulic system 31C is represented as $P_B$ (a second hydraulic value). The first controller 33A and the second controller 33B hold two threshold values regarding the hydraulic pressure, $P_L$ (a first threshold value) and $P_H$ (a second threshold value). The first controller 33A and the second controller 33B determine a magnitude relationship between the hydraulic pressures $P_A$ and $P_B$ and the threshold values $P_L$ and $P_H$, to thereby switch the first actuator 21A and the second actuator 21B. The threshold values $P_L$ and $P_H$ have a relationship of $P_L < P_H$.

In the present embodiment, the two threshold values of $P_L$ and $P_H$ are provided in consideration of a pressure pulsation or the like, and the two threshold values are also in the relationship of $P_L < P_H$, so that a hysteresis is provided. That is, if there is provided only one threshold value, the magnitude determination between the hydraulic pressures may be frequently changed. The first actuator 21A and the second actuator 21B may be thereby frequently switched. The two threshold values are provided so as to prevent the above situation. In the present invention, the threshold value $P_L$ and the threshold value $P_H$ may also correspond to each other.

[Position Detection and Comparison by the Controller 33A]

The first controller 33A also compares a target position based on the movement command to the aileron 10 from the flight controller 40, and a current position, and successively obtains a difference therebetween. The first controller 33A determines a magnitude relationship between the difference and a threshold value as described below, and thereby switches the first actuator 21A and the second actuator 21B.

The target position and the current position are identified in association with the deflection angle of the aileron 10. When the target position is $\theta_T$, the current position is $\theta_N$, and the threshold value is $\theta_R$ (a third threshold value), a difference $\Delta\theta$ is $|\theta_T-\theta_N|$. The first controller 33A successively determines the magnitude relationship between the difference $\Delta\theta$ ($|\theta_T-\theta_N|$) and the threshold value $\theta_R$.

Here, the case in which the first actuator 21A is in the active state is described. However, when the second actuator 21B is in the active state, the second controller 33B successively determines the magnitude relationship between the difference $\Delta\theta$ ($|\theta_T-\theta_N|$) and the threshold value $\theta_R$.

The target position is a target position of a cylinder of the first actuator 21A or the second actuator 21B calculated in the controller. The current position is a current cylinder position read out from a sensor that is attached to the cylinder. Both the positions are associated with the deflection angle of the aileron 10. The target position is set by the operation by a pilot in some cases, and set by an automatic pilot in other cases.

[Failure Detection by the Controllers 33A and 33B]

The first controller 33A has a function to detect a failure of a device belonging to the left-side hydraulic system 31L. The second controller 33B also has a function to detect a failure of a device belonging to the center hydraulic system 31C. As described below, when the first actuator 21A is in the active state, and the first controller 33A detects a failure of any of the devices, the second actuator 21B is switched to the active state. When the second actuator 21B is in the active state, the opposite operation is performed.

At least the left-side hydraulic power source 35L, the center hydraulic power source 35C, and the control valves 23A and 23B fall under the devices as a target of the failure detection. Examples of the devices also include devices belonging to the left-side hydraulic system 31L, and the center hydraulic system 31C.

[Procedure for Switching the Actuators]

Figure 3:
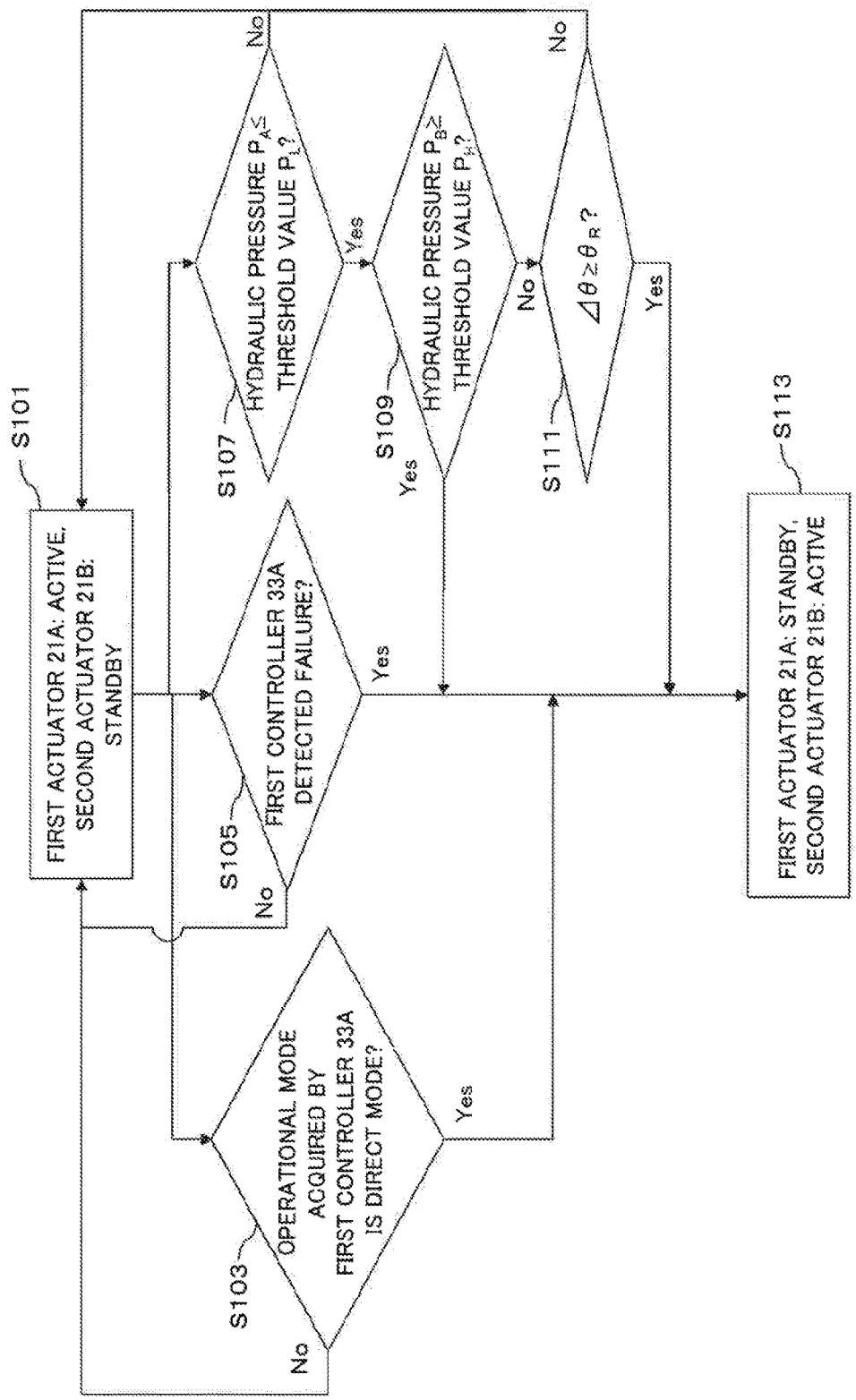
FIG. 3 is a view illustrating a procedure for determining switching of actuators in the actuator device in FIG. 1.

Next, a procedure for switching the first actuator 21A and the second actuator 21B of the actuator device 20 according to the present embodiment between the active and standby states is described by reference to FIG. 3. It is assumed that the first actuator 21A is in the active state and the second actuator 21B is in the standby state (FIG. 3, S101). Also, description is made by using the left-side main wing 2 as an example.

The switching is determined based on three conditions of the operation mode (FIG. 3, S103), the failure detection (FIG. 3, S105), and the hydraulic state (FIG. 3, S107 and S109). When one of the three conditions is satisfied, the states of the actuators are switched. In the following, the conditions are described in the order of the operation mode, the failure detection, and the hydraulic state for the sake of convenience. However, the operation mode, the failure detection, and the hydraulic state may be determined at the same time in an actual case.

[Determination Based on the Operation Mode]

The first controller 33A acquires information regarding the operation mode from the flight controller 40, and determines whether the acquired operation mode is the normal mode or the direct mode (FIG. 3, S103). When the acquired operation mode is the normal mode, the first actuator 21A is maintained in the active state and the second actuator 21B is maintained in the standby state (FIG. 3, S101). Meanwhile, when the acquired operation mode is the direct mode, the first actuator 21A is switched to the standby state, and the second actuator 21B is switched to the active state (FIG. 3, S113).

The above determination is made so as to maintain the operation in the normal mode as much as possible. For example, even when the operation mode is changed to the direct mode with a failure detected in the left-side hydraulic system 31L, the center hydraulic system 31C may be able to operate in the normal mode, and thus, the center hydraulic system 31C controls the movement of the aileron 10. Meanwhile, the center hydraulic system 31C originally in the standby state can directly continue the control even when entering the direct mode itself.

[Determination Based on the Failure Detection]

As described above, the first controller 33A has the function to detect the failure of the devices belonging to the left-side hydraulic system 31L, and constantly determines whether there is a failure in any of the devices (FIG. 3, S105). When there is no device failure, the first actuator 21A is maintained in the active state, and the second actuator 21B is maintained in the standby state (FIG. 3, S101). Meanwhile, when the first controller 33A detects a failure in any of the devices, the first actuator 21A is switched to the standby state, and the second actuator 21B is switched to the active state (FIG. 3, S113).

[Determination Based on the Hydraulic State]

The first controller 33A determines the magnitude relationship between the hydraulic pressure $P_A$ of the left-side hydraulic system 31L (a first hydraulic system) and the threshold value $P_L$ (FIG. 3, S107).

When the hydraulic pressure $P_A$ exceeds the threshold value (a lower limit) $P_L$, the first actuator 21A is maintained in the active state, and the second actuator 21B is maintained in the standby state (FIG. 3, S101).

On the other hand, when the hydraulic pressure $P_A$ of the left-side hydraulic system 31L drops to be equal to or less than the threshold value (the lower limit) $P_L$, the magnitude relationship between the hydraulic pressure $P_B$ of the center hydraulic system 31C and the threshold value $P_H$ is determined (FIG. 3, S109). When the hydraulic pressure $P_B$ is equal to or more than the threshold value $P_H$, the first actuator 21A is switched to the standby state, and the second actuator 21B is switched to the active state (FIG. 3, S113).

Meanwhile, when the hydraulic pressure $P_B$ does not reach the threshold value $P_H$, the first actuator 21A and the second actuator 21B are determined whether to be switched based on the determination of the magnitude relationship between the difference $\Delta\theta$ ($|\theta_T-\theta_N|$) between the target position $\theta_T$ and the current position $\theta_N$, and the threshold value $\theta_R$ (FIG. 3, S111). That is, when the difference $\Delta\theta$ is less than the threshold value $\theta_R$, there is no influence on the movement position (the deflection angle) of the aileron 10 even when the hydraulic pressure $P_A$ of the left-side hydraulic system 31L is reduced. Thus, the first actuator 21A is maintained in the active state, and the second actuator 21B is maintained in the standby state (FIG. 3, S101). Meanwhile, when the difference $\Delta\theta$ is equal to or more than the threshold value $\theta_R$, the first actuator 21A is switched to the standby state, and the second actuator 21B is switched to the active state (FIG. 3, S113).

With regard to the right-side main wing 2, the determination similar to the above determination is performed between the left-side hydraulic system 31L and the right-side hydraulic system 31R, and the first actuator 21A and the second actuator 21B are switched between the active state and the standby state.

After the first actuator 21A is switched to the standby state, and the second actuator 21B is switched to the active state, the first actuator 21A may be switched to the active state, and the second actuator 21B may be switched to the standby state again in the procedure described above.

Effects of the Present Embodiment

The above actuator device 20 produces following effects.

The actuator device 20 according to the present invention concurrently monitors the plurality of determination conditions including the operation mode, the failure detection, and the hydraulic state. When one of the determination conditions is satisfied, the second actuator 21B is immediately switched to the active state from the first actuator 21A. Therefore, the reliability of the movement of the aileron 10 is improved, and the flight safety of the aircraft 1 is further ensured.

Next, the actuator device 20 uses the hydraulic state in the system as one of the switching conditions, which effectively prevents a transient (a rapid change in the deflection angle) as described below.

To be more specific, that there occurs a failure in the left-side hydraulic system 31L for controlling the first actuator 21A and the hydraulic pressure in the system is reduced can be also determined based on the above magnitude relationship between the difference $\Delta\theta$ and the threshold value $\theta_R$. However, if the left-side hydraulic system 31L is switched to the center hydraulic system 31C by determining that the hydraulic pressure is reduced when the difference $\Delta\theta$ reaches the threshold value $\theta_R$, there is a large difference between the current position of the second actuator 21B that has been in the standby state, and the target position $\theta_1$. Thus, the second actuator 21B switched to the active state operates rapidly to the target position $\theta_1$ that is largely different from the current position. A transient thereby occurs.

Thus, in the present embodiment, when the hydraulic pressure $P_A$ in the system regarding the first actuator 21A is detected to be reduced, the actuators are immediately switched, thereby suppressing the occurrence of the transient. Accordingly, the actuator device 20 can suppress a rapid change in the deflection angle of the aileron 10 at the time of switching of the hydraulic systems.

Since the actuator device 20 switches the second actuator 21B to the active state from the first actuator 21A after determining whether the hydraulic pressure $P_B$ of the center hydraulic system 31C is equal to or more than the threshold value $P_H$, the reliability of the movement of the aileron 10 after switching the actuators can be ensured.

The present invention allows switching of the first actuator 21A to the standby state and the second actuator 21B to the active state even when the hydraulic pressure $P_B$ is less than the threshold value $P_H$. In this case, the first actuator 21A is switched to the active state, and the second actuator 21B is switched to the standby state again in the procedure described above.

Although the present invention has been described based on a preferred embodiment, the configurations described in the embodiment described above may be also freely selected or changed into other configurations without departing from the gist of the present invention.

The present embodiment has been described by using the aileron 10 as an example of a flight control surface. However, the present invention may be also applied to, for example, an actuator device that drives an elevator provided at a horizontal tail, or an actuator device that drives a rudder provided at a vertical tail.

Although the example in which the two actuators of the first actuator 21A and the second actuator 21B are provided for one flight control surface is described in the present embodiment, three or more actuators may be also provided for one flight control surface in the present invention. In this case, one actuator may be in the active state, and the remaining actuators may be in the standby state. Alternatively, plural, e.g., two actuators may be in the active state, and the remaining one or plural actuators may be in the standby state.

What is claimed is:

1. An actuator device for an aircraft comprising:
   a first actuator that is operable to drive a flight control surface of the aircraft;
   a second actuator that is operable to drive the flight control surface; and
   a control system configured to control operation of the first actuator and the second actuator,
   wherein the first actuator drives the flight control surface upon supply of hydraulic oil through a first hydraulic system from a first hydraulic power source,
   wherein the second actuator drives the flight control surface upon supply of hydraulic oil through a second hydraulic system from a second hydraulic power source,
   wherein the control system is configured to monitor a first hydraulic value of the hydraulic oil in the first hydraulic system and a second hydraulic value of the hydraulic oil in the second hydraulic system,
   wherein the control system is configured to compare the monitored first hydraulic value to a predetermined first threshold value and compare the monitored second hydraulic value to a predetermined second threshold value,
   wherein in a state in which the first actuator functions in an active state and the second actuator functions in a standby state, the control system is configured to perform a switching operation in response to a first condition set being satisfied,
   wherein under the first condition set, the control system determines that the monitored first hydraulic value is equal to or less than the predetermined first threshold value and the monitored second hydraulic value is equal to or more than the predetermined second threshold value,
   wherein under the switching operation, the control system switches the first actuator from the active state to a standby state and the control system switches the second actuator from the standby state to an active state,
   wherein under the switching operation, the first actuator is in the active state when the control system switches the second actuator to the active state, wherein the control system is further configured to monitor a current position of a cylinder of the first actuator and compare the monitored current position to a target position, and wherein in the state in which the first actuator functions in the active state and the second actuator functions in the standby state, the control system is further configured to perform the switching operation in response to a second condition set being satisfied, and wherein under the second condition set, the control system determines that the monitored first hydraulic value is equal to or less than the predetermined first threshold value, the monitored second hydraulic value is less than the predetermined second threshold value, and a difference between the monitored current position and the target position of the cylinder of the first actuator is equal to or more than a predetermined third threshold value.

2. The actuator device for the aircraft according to claim 1, wherein the first threshold value and the second threshold value have a relationship such that the first threshold value is less than the second threshold value.

3. The actuator device for the aircraft according to claim 1, wherein the flight control surface is an aileron.

4. The actuator device for the aircraft according to claim 1, wherein in the state in which the first actuator functions in the active state and the second actuator functions in the standby state, the control system is further configured to perform the switching operation in response to a third condition set being satisfied, wherein under the third condition set the control system detects a failure of a device belonging to the first hydraulic system.

5. The actuator device for the aircraft according to claim 1, further comprising:
a third actuator and a fourth actuator that are each operable to drive another flight control surface of the aircraft,
wherein the third actuator drives the other flight control surface upon supply of hydraulic oil through the first hydraulic system from the first hydraulic power source, and
wherein the fourth actuator drives the other flight control surface upon supply of hydraulic oil through a third hydraulic system from a third hydraulic power source.

6. The actuator device for the aircraft according to claim 1, wherein in the state in which the first actuator functions in the active state and the second actuator functions in the standby state, the control system is further configured to perform the switching operation in response to a third condition set being satisfied, wherein under the third condition set the control system detects that an operation mode for the first hydraulic system is changed from a normal mode to a direct mode.

7. The actuator device for the aircraft according to claim 6, wherein in the state in which the first actuator functions in the active state and the second actuator functions in the standby state, the control system is further configured to perform the switching operation in response to a fourth condition set being satisfied, wherein under the fourth condition set the control system detects a failure of a device belonging to the first hydraulic system.

8. An actuator device for an aircraft comprising:
a first actuator that is operable to drive a flight control surface of the aircraft;
a second actuator that is operable to drive the flight control surface; and
a control system configured to control operation of the first actuator and the second actuator,
wherein the first actuator drives the flight control surface upon supply of hydraulic oil through a first hydraulic system from a first hydraulic power source,
wherein the second actuator drives the flight control surface upon supply of hydraulic oil through a second hydraulic system from a second hydraulic power source,
wherein the control system is configured to monitor a first hydraulic value of the hydraulic oil in the first hydraulic system and a second hydraulic value of the hydraulic oil in the second hydraulic system,
wherein the control system is configured to compare the monitored first hydraulic value to a predetermined first threshold value and compare the monitored second hydraulic value to a predetermined second threshold value,
wherein in a state in which the first actuator functions in an active state and the second actuator functions in a standby state, the control system is configured to perform a switching operation in response to a first condition set being satisfied,
wherein under the first condition set, the control system determines that the monitored first hydraulic value is equal to or less than the predetermined first threshold value and the monitored second hydraulic value is equal to or more than the predetermined second threshold value,
wherein under the switching operation, the control system switches the first actuator from the active state to a standby state and the control system switches the second actuator from the standby state to an active state,
wherein under the switching operation, the first actuator is in the active state when the control system switches the second actuator to the active state, and
wherein in the state in which the first actuator functions in the active state and the second actuator functions in the standby state, the control system is further configured to perform the switching operation in response to a second condition set being satisfied, wherein under the second condition set the control system detects that an operation mode for the first hydraulic system is changed from a normal mode to a direct mode.

9. The actuator device for the aircraft according to claim 8, wherein the first threshold value and the second threshold value have a relationship such that the first threshold value is less than the second threshold value.

10. The actuator device for the aircraft according to claim 8, wherein the flight control surface is an aileron.

11. The actuator device for the aircraft according to claim 8, further comprising:
a third actuator and a fourth actuator that are each operable to drive another flight control surface of the aircraft,
wherein the third actuator drives the other flight control surface upon supply of hydraulic oil through the first hydraulic system from the first hydraulic power source, and
wherein the fourth actuator drives the other flight control surface upon supply of hydraulic oil through a third hydraulic system from a third hydraulic power source.

12. The actuator device for the aircraft according to claim 8, wherein in the state in which the first actuator functions in the active state and the second actuator functions in the standby state, the control system is further configured to perform the switching operation in response to a third condition set being satisfied, wherein under the third condition set the control system detects a failure of a device belonging to the first hydraulic system.

13. The actuator device for the aircraft according to claim 8, wherein the control system is further configured to monitor a current position of a cylinder of the first actuator and compare the monitored current position to a target position,
   wherein in the state in which the first actuator functions in the active state and the second actuator functions in the standby state, the control system is further configured to maintain the first actuator in the active state and the second actuator in the standby state in response to a third condition set,
   wherein under the third condition set, the control system determines that the monitored first hydraulic value is equal to or less than the predetermined first threshold value, the monitored second hydraulic value is less than the predetermined second threshold value, and a difference between the monitored current position and the target position of the cylinder of the first actuator is less than a predetermined third threshold value.

14. The actuator device for the aircraft according to claim 13, wherein in the state in which the first actuator functions in the active state and the second actuator functions in the standby state, the control system is further configured to perform the switching operation in response to a fourth condition set being satisfied, wherein under the fourth condition set the control system detects a failure of a device belonging to the first hydraulic system.

15. The actuator device for the aircraft according to claim 14, wherein in the state in which the first actuator functions in the active state and the second actuator functions in the standby state, the control system is further configured to perform the switching operation in response to a fifth condition set being satisfied,
   wherein under the fifth condition set the control system detects a failure of a device belonging to the first hydraulic system, the control system determines that the monitored first hydraulic value is equal to or less than the predetermined first threshold value, the monitored second hydraulic value is less than the predetermined second threshold value, and the difference between the monitored current position and the target position of the cylinder of the first actuator is equal to or more than the predetermined third threshold value.

16. The actuator device for the aircraft according to claim 13, wherein in the state in which the first actuator functions in the active state and the second actuator functions in the standby state, the control system is further configured to perform the switching operation in response to a fourth condition set being satisfied,
   wherein under the fourth condition set the control system detects a failure of a device belonging to the first hydraulic system, the control system determines that the monitored first hydraulic value is equal to or less than the predetermined first threshold value, the monitored second hydraulic value is less than the predetermined second threshold value, and the difference between the monitored current position and the target position of the cylinder of the first actuator is equal to or more than the predetermined third threshold value.

17. An actuator device for an aircraft comprising:
   a first actuator that is operable to drive a flight control surface of the aircraft;
   a second actuator that is operable to drive the flight control surface; and
   a control system configured to control operation of the first actuator and the second actuator,
   wherein the first actuator drives the flight control surface upon supply of hydraulic oil through a first hydraulic system from a first hydraulic power source,
   wherein the second actuator drives the flight control surface upon supply of hydraulic oil through a second hydraulic system from a second hydraulic power source,
   wherein the control system is configured to monitor a first hydraulic value of the hydraulic oil in the first hydraulic system and a second hydraulic value of the hydraulic oil in the second hydraulic system,
   wherein the control system is configured to compare the monitored first hydraulic value to a predetermined first threshold value and compare the monitored second hydraulic value to a predetermined second threshold value,
   wherein in a state in which the first actuator functions in an active state and the second actuator functions in a standby state, the control system is configured to perform a switching operation in response to a first condition set being satisfied,
   wherein under the first condition set, the control system determines that the monitored first hydraulic value is equal to or less than the predetermined first threshold value and the monitored second hydraulic value is equal to or more than the predetermined second threshold value,
   wherein under the switching operation, the control system switches the first actuator from the active state to a standby state and the control system switches the second actuator from the standby state to an active state,
   wherein under the switching operation, the first actuator is in the active state when the control system switches the second actuator to the active state,
   wherein the control system is configured to monitor a current position of a cylinder of the first actuator,
   wherein the control system is configured to compare the monitored current position to a target position,
   wherein in the state in which the first actuator functions in the active state and the second actuator functions in the standby state, the control system is further configured to maintain the first actuator in the active state and the second actuator in the standby state in response to a second condition set, and
   wherein under the second condition set, the control system determines that the monitored first hydraulic value is equal to or less than the predetermined first threshold value, the monitored second hydraulic value is less than the predetermined second threshold value, and a difference between the monitored current position and the target position of the cylinder of the first actuator is less than the predetermined third threshold value.

* * * * *

UNITED STATES PATENT AND TRADEMARK OFFICE
CERTIFICATE OF CORRECTION

PATENT NO. : 10,183,739 B2
APPLICATION NO. : 14/190730
DATED : January 22, 2019
INVENTOR(S) : Akihiro Hara It is certified that error appears in the above-identified patent and that said Letters Patent is hereby corrected as shown below:

In the Specification

Column 7, Line 43, "$\theta_1$" should be -- $\theta_T$ --.

Column 7, Line 45, "$\theta_1$" should be -- $\theta_T$ --.

Signed and Sealed this
Sixteenth Day of April, 2019

Andrei Iancu
*Director of the United States Patent and Trademark Office*